(12) United States Patent
Tsai et al.

(10) Patent No.: US 10,490,369 B1
(45) Date of Patent: Nov. 26, 2019

(54) KEY STRUCTURE

(71) Applicant: Primax Electronics Ltd., Taipei (TW)

(72) Inventors: Sheng-An Tsai, Taipei (TW); Li-Jen Chien, Taipei (TW); Hsiang-Wen Cheng, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 0 days.

(21) Appl. No.: 16/217,263

(22) Filed: Dec. 12, 2018

(30) Foreign Application Priority Data

Oct. 5, 2018 (TW) .............................. 107135275 A

(51) Int. Cl.
*H01H 13/85* (2006.01)
*H01H 13/705* (2006.01)
*G06F 3/02* (2006.01)

(52) U.S. Cl.
CPC ........... *H01H 13/85* (2013.01); *G06F 3/0202* (2013.01); *H01H 13/705* (2013.01); *H01H 2215/03* (2013.01)

(58) Field of Classification Search
CPC .... H01H 13/85; H01H 13/84; H01H 2215/03; H01H 13/705
See application file for complete search history.

(56) References Cited

U.S. PATENT DOCUMENTS

| | | | | |
|---|---|---|---|---|
| 5,057,657 A | * | 10/1991 | Skulic | H01H 13/705 200/342 |
| 5,186,316 A | * | 2/1993 | Mortun | H01H 13/585 200/276.1 |
| 7,514,643 B1 | * | 4/2009 | Tittle | H01H 13/023 200/314 |

* cited by examiner

*Primary Examiner* — Felix O Figueroa
(74) *Attorney, Agent, or Firm* — Kirton McConkie; Evan R. Witt

(57) ABSTRACT

The present invention provides a key structure, including: a key pedestal, a key support shaft, a keycap, a rotating member, and an elastic element. The key pedestal is provided with a sleeve structure, a press member of the key support shaft is disposed in the sleeve structure, and the rotating member and the elastic element are disposed in the sleeve structure and located below the press member. When the keycap is pressed by an external force, the press member presses on the rotating member to drive the rotating member to rotate so as to generate a sound.

14 Claims, 6 Drawing Sheets

KEY STRUCTURE

FIELD OF THE INVENTION

The present invention relates to a structure of an input device, and more particularly to a key structure.

BACKGROUND OF THE INVENTION

In the modern society, the use of electronic products has become an indispensable part of the life, and necessities such as eating, clothing, living, traveling, teaching, and entertainment are correlated to electronic products. Usually, an electronic product is provided with a key structure. To make it easier to assemble a key structure, measures are taken to simplify configurations of a support structure in the key structure. However, simplification of the support structure may also cause loss of the stepped feel of the original pressing strokes of the key, and loss of the feedback sound when the key is tapped. As a result, uncomfortable pressing feel is generated for a user, and therefore the user cannot maintain the original good typing rhythm.

Therefore, how to still enable a key structure to generate an appropriate stepped feel of pressing and a tapping sound when design of the key structure is simplified is a technical issue to be resolved by the present invention.

SUMMARY OF THE INVENTION

A main objective of the present invention is providing a key structure having a stepped feel of pressing and a tapping sound, to generate a comfortable pressing feel for a user, so that the user can maintain the original good typing rhythm.

To achieve the foregoing objective, the present invention provides a key structure, including:
- a key pedestal, having a key slot and a sleeve structure adjacent to the key slot, an inner surface of one end of the sleeve structure being provided with a first limit flange, and the other end opposite thereto being provided with a stop structure;
- a key support shaft, having a push member and a press member connected to the push member, the push member being disposed in the key slot and capable of shifting up and down, the press member being configured in the sleeve structure and being interlocked with the push member, and the press member having a first ratchet part;
- a keycap, coupled to the push member;
- a rotating member, disposed in the sleeve structure and located below the press member, the rotating member including:
  - a second ratchet part, corresponding to the first ratchet part; and
  - a second limit flange, disposed on a circumferential surface of the rotating member and configured to fit with the first limit flange, so as to limit rotation of the rotating member; and
- an elastic element, disposed in the sleeve structure, located between the rotating member and the stop structure, and configured to press against the rotating member, where
- when the keycap is pressed by an external force, the press member presses on the rotating member, so that the rotating member gradually departs from limit of the first limit flange, to rotate and to therefore generate a sound.

In the foregoing preferred embodiment, an annular base is provided at a bottom part of the key pedestal.

In the foregoing preferred embodiment, the key structure further includes a switch module, the switch module being disposed in the annular base.

In the foregoing preferred embodiment, the switch module includes a membrane circuit board and an elastomer disposed on the membrane circuit board.

In the foregoing preferred embodiment, when the keycap is pressed by the external force, the push member presses on the elastomer to enable the switch module to generate a corresponding key signal.

In the foregoing preferred embodiment, when the external force is released, the elastomer restores elastically and provides an elastic restoring force to the push member to reset the key support shaft, and at the same time the elastic element extends elastically to rotatably reset the rotating member and to therefore generate a sound.

In the foregoing preferred embodiment, the first ratchet part and the second ratchet part are one-way ratchets.

In the foregoing preferred embodiment, the first limit flange has a plurality of first limit inclined planes, the second limit flange has a plurality of second limit inclined planes, and the first limit inclined planes fit with the second limit inclined planes to limit rotation of the rotating member.

In the foregoing preferred embodiment, a limit hole running through the press member is provided at a center of the first ratchet part, a limit shaft protrudes from a center of the second ratchet part, and the limit shaft movably passes through the limit hole, so that the rotating member rotates by using the limit shaft as an axle center.

In the foregoing preferred embodiment, the keycap has a first engagement structure, the push member has a second engagement structure, and the first engagement structure fits with the second engagement structure, so that the keycap is detachably coupled to the push member.

In the foregoing preferred embodiment, the elastic element is a spring.

In the foregoing preferred embodiment, the rotating member has a limit base disposed opposite to the second ratchet part and a limit recess disposed around the limit base, and one end of the elastic element inserts into the limit recess and is sleeved over the limit base.

In the foregoing preferred embodiment, one side of the push member has a recess structure, the recess structure is configured to partially accommodate the sleeve structure, and the press member is located in the recess structure and is connected to the push member by means of a connection part.

In the foregoing preferred embodiment, a housing of the sleeve structure adjacent to the key slot is provided with a guiding slot, and the connection part passes through the guiding slot and moves along the guiding slot.

DETAILED DESCRIPTION OF THE PREFERRED EMBODIMENT

More detailed descriptions are made with reference to the examples of the embodiments and the accompanying drawings, to make advantages and features of the present invention and the method to implement the present invention easier to understand. However, the present invention may be implemented in different forms and it should not be understood that the present invention can be implemented only by using the embodiments described herein. On the contrary, for persons of ordinary skill in the art, the provided embodiments will make the disclosure more apparent and comprehensive and completely convey the scope of the present invention.

Figure 1A:
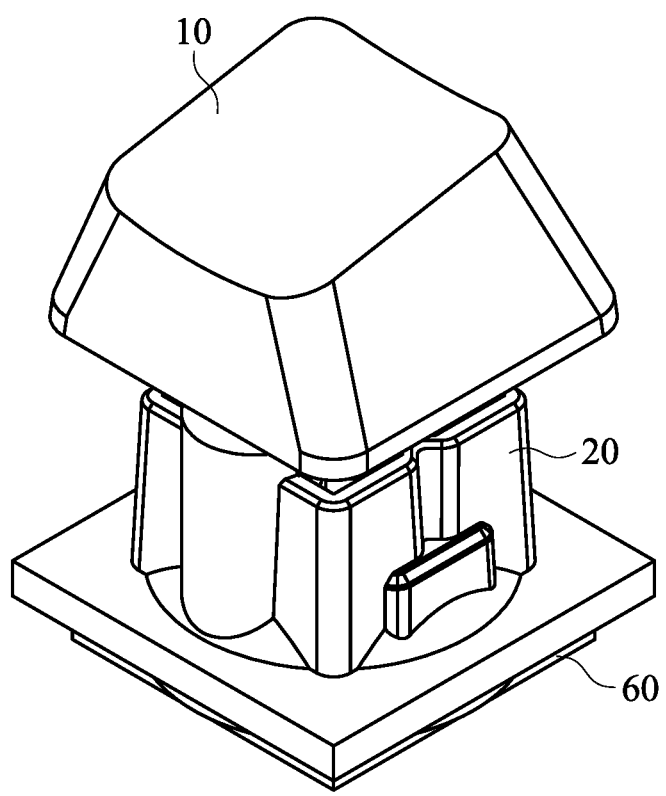
FIG. 1A is a schematic three-dimensional diagram of a key structure according to the present invention.
Figure 1B:
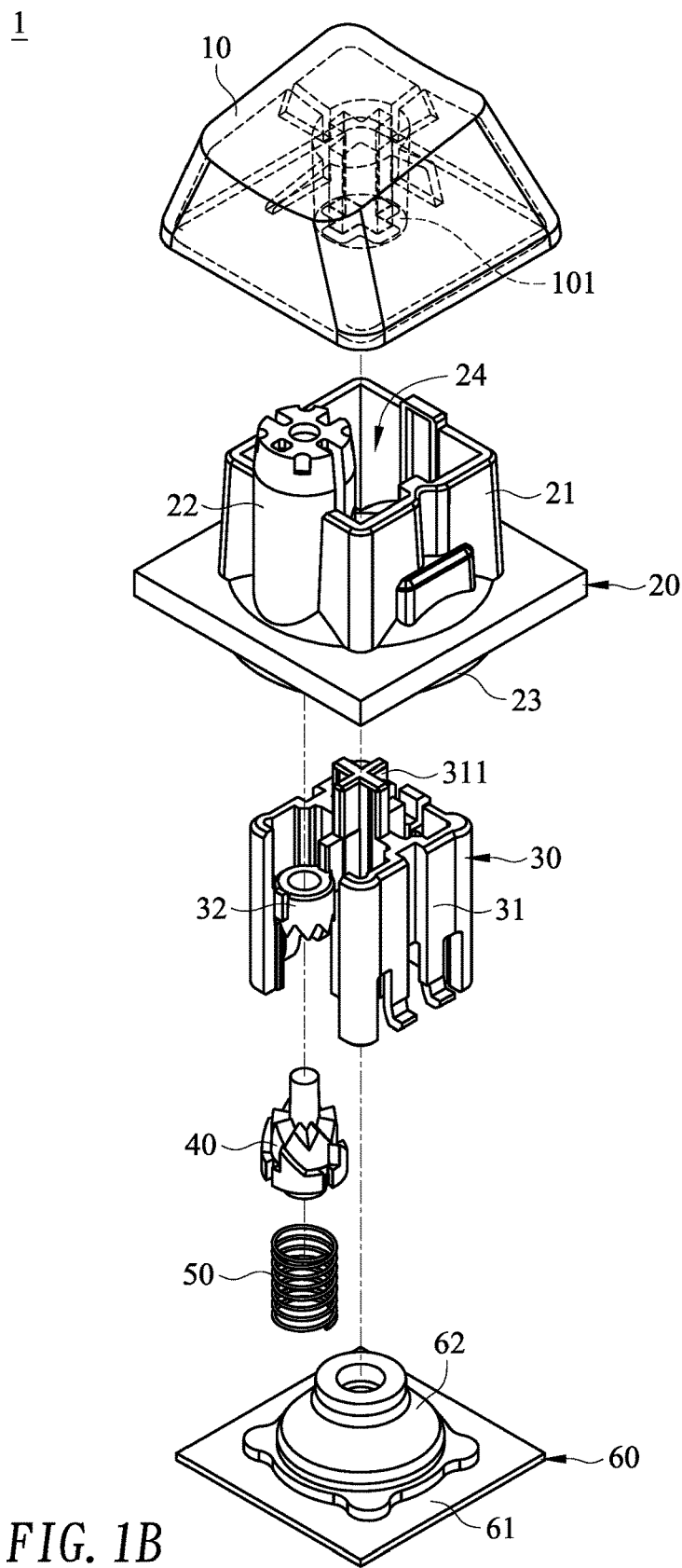
FIG. 1B is a three-dimensional exploded view of a key structure according to the present invention.

First, referring to FIG. 1A and FIG. 1B, FIG. 1A is a schematic three-dimensional diagram of a key structure according to the present invention, and FIG. 1B is a three-dimensional exploded view of a key structure according to the present invention. A key structure 1 of the present invention includes: a keycap 10, a key pedestal 20, a key support shaft 30, a rotating member 40, an elastic element 50, and a switch module 60.

A first engagement structure 101 is provided at a lower surface of the keycap 10. The key pedestal 20 has an annular side wall 21, a sleeve structure 22 connected to the side wall 21, and an annular base 23 located at a bottom part of the key pedestal 20. A key slot 24 running through the key pedestal 20 is formed on the annular side wall 21, and the sleeve structure 22 is adjacent to the key slot 24 and partially protrudes from the key slot 24. The key support shaft 30 has a push member 31 and a press member 32 connected to the push member 31, and the push member 31 has a second engagement structure 311 corresponding to the first engagement structure 101. The switch module 60 includes a membrane circuit board 61 and an elastomer 62 disposed on the membrane circuit board 61, the elastomer 62 corresponds to a switch (not shown) on the membrane circuit board 61, and the elastomer 62 deforms to contact the switch so as to generate a corresponding key signal.

Still referring to FIG. 1A and FIG. 1B, the push member 31 is disposed in the key slot 24 and capable of shifting up and down, and the press member 32 is configured in the sleeve structure 22 and capable of synchronously shifting together with the push member 31. The first engagement structure 101 of the keycap 10 can fit with the second engagement structure 311 of the push member 31, to enable the keycap 10 to be detachably coupled to the push member 31. In this way, a user may replace keycaps of different colors, appearances, or materials based on needs or preferences, and in this embodiment, the first engagement structure 101 is a crisscross recess and the second engagement structure 311 is a crisscross shaft lever. The rotating member 40 and the elastic element 50 are both disposed in the sleeve structure 22, the rotating member 40 is located below the press member 32, and the elastic element 50 may be a spring and is configured to press against the rotating member 40, so that the rotating member 40 has a trend of moving towards the press member 32 and is capable of performing reciprocating shift in the sleeve structure 22. The switch module 60 is disposed in the annular base 23, and the elastomer 62 is configured to provide an elastic restoring force to the push member 31 of the key support shaft 30.

Figure 2A:
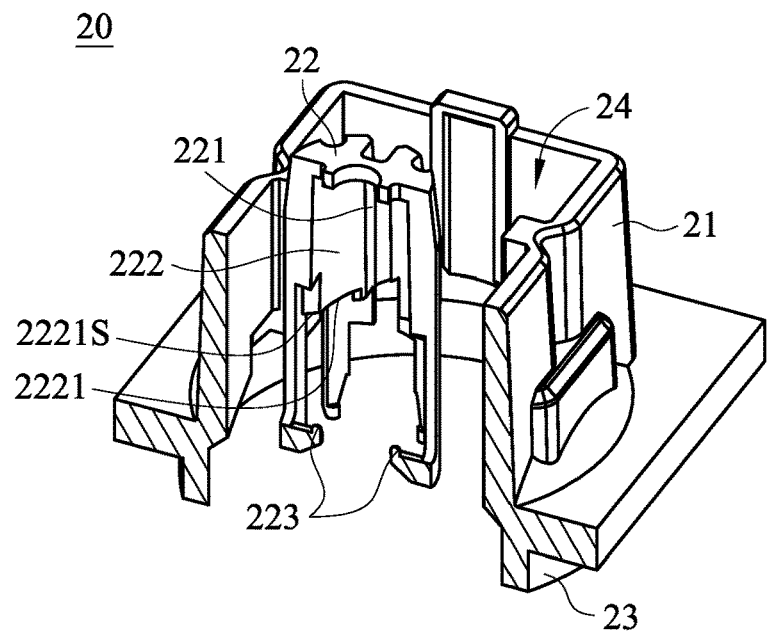
FIG. 2A is a partial cross-sectional diagram of a key pedestal according to the present invention from an angle.
Figure 2B:
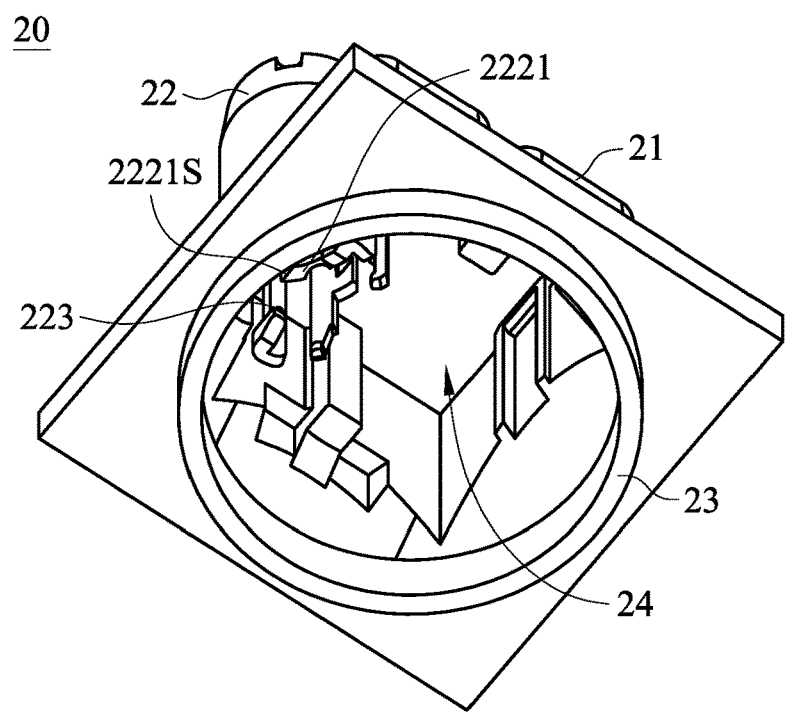
FIG. 2B is a schematic three-dimensional diagram of a key pedestal according to the present invention from another angle.

Referring to FIG. 2A and FIG. 2B, FIG. 2A is a partial cross-sectional diagram of a key pedestal according to the present invention from an angle, and FIG. 2B is a schematic three-dimensional diagram of a key pedestal according to the present invention from another angle. An inner surface of one end of the sleeve structure 22 is provided with a protruding first limit flange 222, the first limit flange 222 is provided with a plurality of first limit inclined planes 2221, and the first limit inclined planes 2221 each have a first tip 2221S; and the other end opposite thereto is provided with a stop structure 223. In addition, a housing of the sleeve structure 22 adjacent to the key slot 24 is provided with a guiding slot 221 disposed along an axial direction.

Figure 3A:
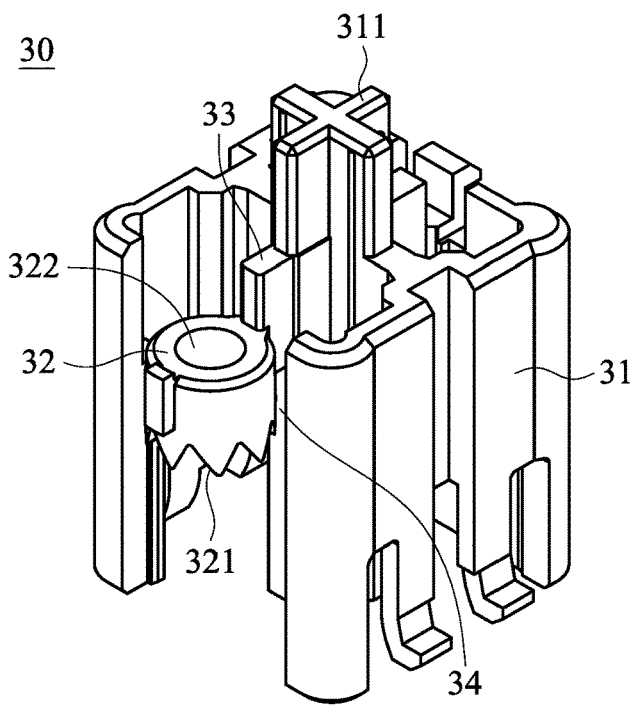
FIG. 3A is a schematic three-dimensional diagram of a key support shaft according to the present invention from an angle.
Figure 3B:
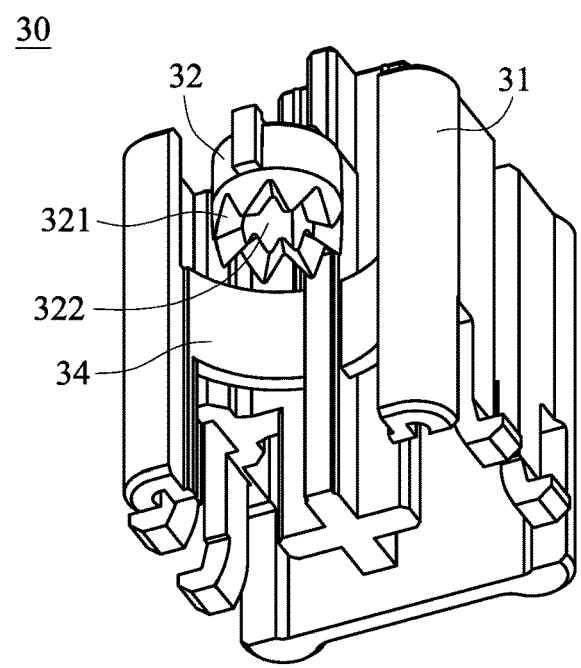
FIG. 3B is a schematic three-dimensional diagram of a key support shaft according to the present invention from another angle.

Referring to FIG. 3A and FIG. 3B, FIG. 3A is a schematic three-dimensional diagram of a key support shaft according to the present invention from an angle, and FIG. 3B is a schematic three-dimensional diagram of a key support shaft according to the present invention from another angle. One side of the push member 31 has a recess structure 34 with a shape corresponding to that of the sleeve structure 22 and is configured to partially accommodate the sleeve structure 22. The press member 32 is located in the recess structure 34 and is connected to the push member 31 by using a connection part 33. It should be noted that when the push member 31 is disposed in the key slot 34 and the press member 32 is configured in the sleeve structure 22, the connection part 33 passes through the guiding slot 221 of the sleeve structure 22 (as shown in FIG. 2A) and may move along the guiding slot 221, so that the press member 32 configured in the sleeve structure 22 may be interlocked with the push member 31. The press member 32 has a first ratchet part 321 and a limit hole 322 in the center of the first ratchet part 321 and running through the press member 32, and the first ratchet part 321 is a one-way ratchet. Although the present invention only proposes the implementation in which the push member 31 has a recess structure 34, in actual application, it is not necessary to further dispose a corresponding recess structure 34 on one side of the push member 31 if the sleeve structure 22 does not partially protrude from the key slot 24.

Figure 4A:
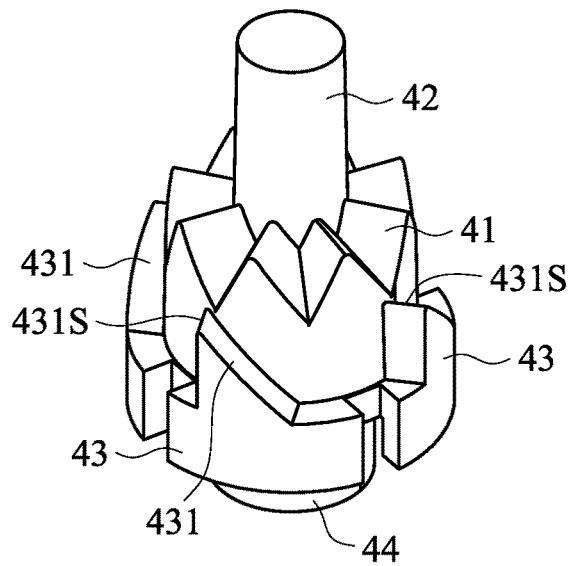
FIG. 4A is a schematic three-dimensional diagram of a rotating member according to the present invention from an angle.
Figure 4B:
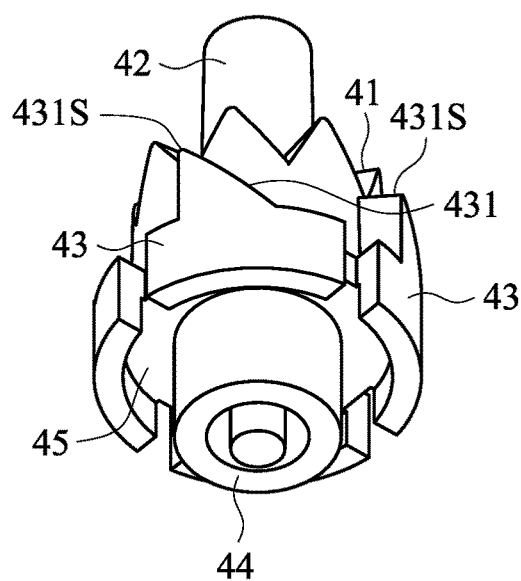
FIG. 4B is a schematic three-dimensional diagram of a rotating member according to the present invention from another angle.

Referring to FIG. 4A and FIG. 4B, FIG. 4A is a schematic three-dimensional diagram of a rotating member according to the present invention from an angle, and FIG. 4B is a schematic three-dimensional diagram of a rotating member according to the present invention from another angle. The rotating member 40 has a second ratchet part 41 corresponding to the first ratchet part 321 (as shown in FIG. 3A and FIG. 3B), and the second ratchet part 41 is also a one-way ratchet. A limit shaft 42 protrudes from a center of the second ratchet part 41, the limit shaft 42 movably passes through the limit hole 322 of the press member 32 (as shown in FIG. 3A and FIG. 3B), so that the rotating member 40 rotates by using the limit shaft 42 as an axle center. In addition, a second limit flange 43 is disposed on a circumferential surface of the rotating member 40, the second limit flange 43 has a plurality of second limit inclined planes 431 corresponding to the first limit inclined planes 2221 of the first limit flange 222 (as shown in FIG. 2A), and the second limit inclined planes 431 each have a second tip 431S. The first limit inclined planes 2221 fit with the second limit inclined planes 431 to limit rotation of the rotating member 40. The other end of the rotating member 40 opposite to the second ratchet part 41 is provided with a limit base 44 and a limit recess 45 disposed around the limit base 44. In this way, one end of the elastic element 50 (as shown in FIG. 1B) can press on the stop structure 223 (as shown in FIG. 2A and FIG. 2B), and the other end opposite thereto inserts into the limit recess 45 and is sleeved over the limit base 44 to press against the rotating member 40, so that the rotating member 40 has a trend of moving towards the press member 32 and is capable of performing reciprocating shift in the sleeve structure 22. It should be noted that when the rotating member 40 is pressed by the press member 32 so that when the second tip 431S of the second limit inclined plane 431 departs from the first tip 2221S along the first limit inclined plane 2221 (as shown in FIG. 2A and FIG. 2B), the rotating member 40 rotates.

Figure 5:
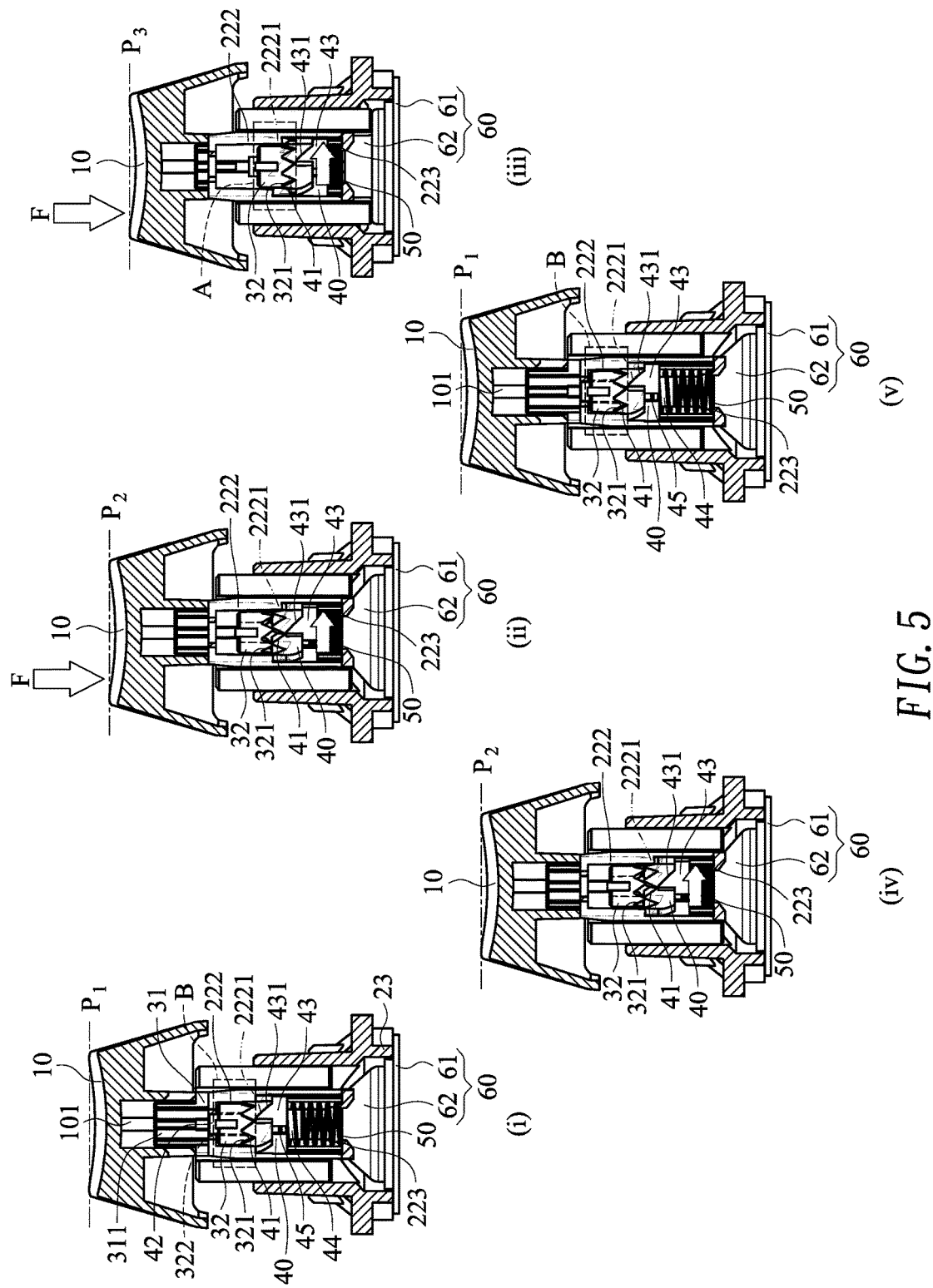
FIG. 5 is a schematic diagram of actions of a key structure according to the present invention.

Referring to FIG. 5, FIG. 5 is a schematic diagram of actions of a key structure according to the present invention. In FIG. (i) of FIG. 5, if the keycap 10 is located at a first press position P1 and one end of the elastic element 50 presses on the stop structure 223, the other end opposite thereto inserts into the limit recess 45 and is sleeved over the limit base 44, to press against the rotating member 40, so that the rotating member 40 has a trend of moving towards the press member 32. At this time, the first ratchet part 321 of the press member 32 is engaged with the second ratchet part 41 of the rotating member 40, and the plurality of second limit inclined planes 431 of the second limit flange 43 fit with the first limit inclined planes 2221 of the first limit flange 222 in the rotating member 40, so that the rotating member 40 cannot rotate, and the limit shaft 42 passes through the limit hole 322. Next, referring to FIG. (ii) of FIG. 5, when the keycap 10 is pressed by an external force F to move to a second press position P2, the push member 31 drives the press member 32 to press on the rotating member 40. At this time, the rotating member 40 may rotate as the second tips 431S of the second limit inclined planes 431 (as shown in FIG. 4A and FIG. 4B) depart from the first tips 2221S (as shown in FIG. 2A and FIG. 2B) along the first limit inclined planes 2221, and the first ratchet part 321 and the second ratchet part 41 press against each other but are not engaged. Subsequently, referring to FIG. (iii) of FIG. 5, when the keycap 10 is pressed by the external force F to move to a third press position P3, the first ratchet part 321 of the press member 32 is engaged with the second ratchet part 41 of the rotating member 40, thereby driving the rotating member 40 to rotate, so that a user may have a stepped feel of pressing the key, and meanwhile a key tapping like sound is generated by using rotary beat of the rotating member 40. In addition, the push member 31 may also press on the elastomer 62, so that the switch module 60 generates a corresponding key signal. Further, referring to FIG. (iv) of FIG. 5, when the keycap 10 is not pressed by the external force F, the elastomer 62 restores elastically and provides an elastic restoring force to the push member 31, to reset the key support shaft 30 and to therefore drive the keycap 10 to move to the second press position P2. At this time, the press member 32 is also reset synchronously, and the elastic element 50 extends elastically to rotatably reset the rotating member 40. Finally, referring to FIG. (v) of FIG. 5, the rotating member 40 again hits the first limit flange 222 of the sleeve structure 22 during reset, to generate a key reset like sound. At the same time, the plurality of second limit inclined planes 431 of the second limit flange 43 again fit with the first limit inclined planes 2221 of the first limit flange 222 in the rotating member 40, so that the rotating member 40 cannot rotate.

As compared with the conventional technology, the key structure provided in the present invention can form a stepped feel of key pressing by means of the rotating member of the sleeve structure and meanwhile generate key tapping like and key reset like sounds by pressing on the rotating member, so that a user is enabled to have a comfortable pressing feel and therefore may maintain the original good typing rhythm.

Any modification made to the present invention by persons skilled in the art by means of technical measures shall fall within the protection scope of the claims.

What is claimed is:

1. A key structure, comprising:
   a key pedestal, having a key slot and a sleeve structure adjacent to the key slot, an inner surface of one end of the sleeve structure being provided with a first limit flange, and the other end opposite thereto being provided with a stop structure;
   a key support shaft, having a push member and a press member connected to the push member, the push member being disposed in the key slot and capable of shifting up and down, the press member being configured in the sleeve structure and being interlocked with the push member, and the press member having a first ratchet part;
   a keycap, coupled to the push member;
   a rotating member, disposed in the sleeve structure and located below the press member, the rotating member comprising:
      a second ratchet part, corresponding to the first ratchet part; and
      a second limit flange, disposed on a circumferential surface of the rotating member and configured to fit with the first limit flange, so as to limit rotation of the rotating member; and
   an elastic element, disposed in the sleeve structure, located between the rotating member and the stop structure, and configured to press against the rotating member, wherein
   when the keycap is pressed by an external force, the press member presses on the rotating member, so that the rotating member gradually departs from limit of the first limit flange, to rotate and to therefore generate a sound.

2. The key structure according to claim 1, wherein an annular base is provided at a bottom part of the key pedestal.

3. The key structure according to claim 2, further comprising a switch module, the switch module being disposed in the annular base.

4. The key structure according to claim 3, wherein the switch module comprises a membrane circuit board and an elastomer disposed on the membrane circuit board.

5. The key structure according to claim 4, wherein when the keycap is pressed by the external force, the push member presses on the elastomer to enable the switch module to generate a corresponding key signal.

6. The key structure according to claim 5, wherein when the external force is released, the elastomer restores elastically and provides an elastic restoring force to the push member to reset the key support shaft, and at the same time the elastic element extends elastically to rotatably reset the rotating member and to therefore generate a sound.

7. The key structure according to claim 1, wherein the first ratchet part and the second ratchet part are one-way ratchets.

8. The key structure according to claim 1, wherein the first limit flange has a plurality of first limit inclined planes, the second limit flange has a plurality of second limit inclined planes, and the first limit inclined planes fit with the second limit inclined planes to limit rotation of the rotating member.

9. The key structure according to claim 1, wherein a limit hole running through the press member is provided at a center of the first ratchet part, a limit shaft protrudes from a center of the second ratchet part, and the limit shaft movably passes through the limit hole, so that the rotating member rotates by using the limit shaft as an axle center.

10. The key structure according to claim 1, wherein the keycap has a first engagement structure, the push member has a second engagement structure, and the first engagement structure fits with the second engagement structure, so that the keycap is detachably coupled to the push member.

11. The key structure according to claim 1, wherein the elastic element is a spring.

12. The key structure according to claim 11, wherein the rotating member has a limit base disposed opposite to the second ratchet part and a limit recess disposed around the limit base, and one end of the elastic element inserts into the limit recess and is sleeved over the limit base.

13. The key structure according to claim 1, wherein one side of the push member has a recess structure, the recess structure is configured to partially accommodate the sleeve structure, and the press member is located in the recess structure and is connected to the push member by means of a connection part.

14. The key structure according to claim 13, wherein a housing of the sleeve structure adjacent to the key slot is provided with a guiding slot, and the connection part passes through the guiding slot and moves along the guiding slot.

* * * * *